United States Patent [19]
Kagawa et al.

[11] Patent Number: 4,964,742
[45] Date of Patent: Oct. 23, 1990

[54] BALL BEARING

[75] Inventors: Akinobu Kagawa; Teruichi Inoue, both of Kagawa; Masaru Kametani, Tokushima; Koji Nakamura, Takamatsu, all of Japan

[73] Assignee: Koyo Seiko Co., Ltd., Osaka, Japan

[21] Appl. No.: 398,573

[22] Filed: Aug. 24, 1989

[30] Foreign Application Priority Data

Sep. 5, 1988 [JP] Japan .................. 63-116544[U]
Feb. 10, 1989 [JP] Japan .................. 64-15123

[51] Int. Cl.⁵ .................. F16C 33/58; F16C 33/62
[52] U.S. Cl. .................. 384/515; 384/492; 384/505
[58] Field of Search .................. 384/488, 492, 499–502, 384/505, 513, 515, 537

[56] References Cited

U.S. PATENT DOCUMENTS

| | | | |
|---|---|---|---|
| 1,353,874 | 9/1920 | Wego | 384/505 |
| 1,720,255 | 7/1929 | Adams | 384/515 |
| 2,768,725 | 10/1956 | Foulds et al. | 384/515 X |
| 3,250,581 | 5/1966 | Honroth | 384/505 |
| 3,657,781 | 4/1972 | Camosso | 29/148.4 A |
| 4,603,025 | 7/1986 | Landay et al. | 264/242 |

FOREIGN PATENT DOCUMENTS

| | | | |
|---|---|---|---|
| 147419 | 7/1952 | Australia | 384/515 |
| 529171 | 11/1957 | Italy | 384/505 |
| 1007191 | 10/1905 | United Kingdom | . |
| 132208 | 9/1919 | United Kingdom | 384/492 |

Primary Examiner—Thomas R. Hannon
Attorney, Agent, or Firm—Edwin E. Greigg

[57] ABSTRACT

A ball bearing formed with an outer ring including (i) an inner cylindrical body made of a steel sheet of which one peripheral edge is bent to form a first flange and (ii) an outer cylindrical body of which one peripheral edge is bent to form a second flange and which is fitted to the inner cylindrical body. An inner ring made of any suitable material is provided on its outer circumferential surface thereof with a raceway groove. The inner ring has a shaft hole of any suitable configuration according to a section configuration of a shaft to be inserted into the shaft hole. The first and second flanges of the outer ring are drawn in a direction toward balls in an annular space between the outer and inner rings order to prevent looseness thereof, the parts of the flanges in the vicinity of a Pitch Circle Diameter of the balls being bent and drawn toward the balls in parallel with a rotational axis of the ball bearing, the radially inward-directed parts of the flanges which extend radially inwardly from the drawin portions are at right angles to the rotational axis of the ball bearing and the inner lateral surfaces of the radially inward parts being flat corresponding to the Pitch Circle Diameter of the balls, thus serving as ball guiding members. Gaps formed between the outer circumferential surface of the inner ring and the ends of the flanges of the outer ring, are small so that the ball bearing has a sealing structure.

4 Claims, 2 Drawing Sheets

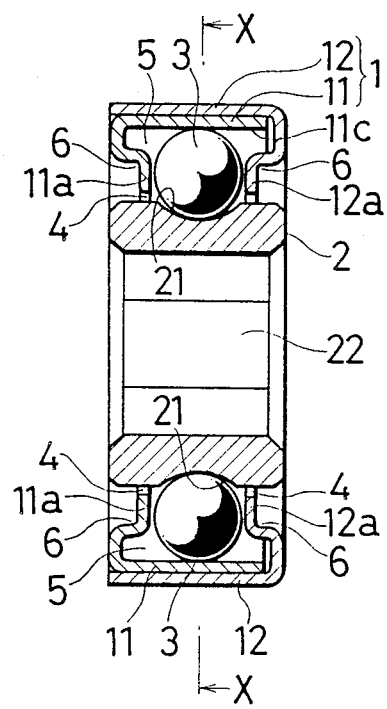
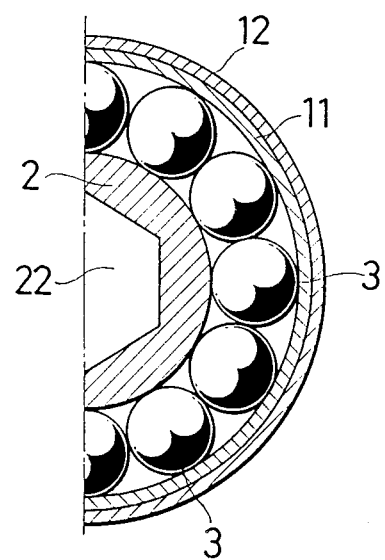
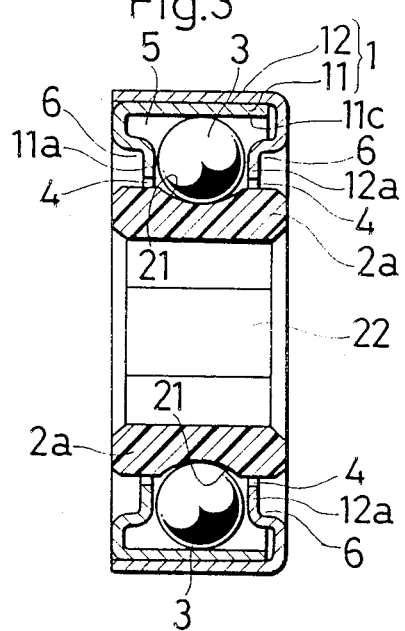

FIG.4(1)
FIG.4(2)
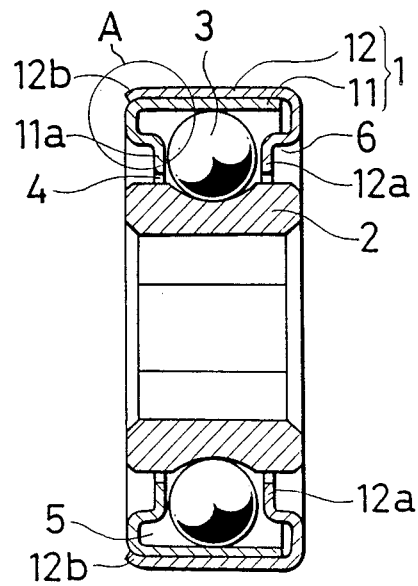
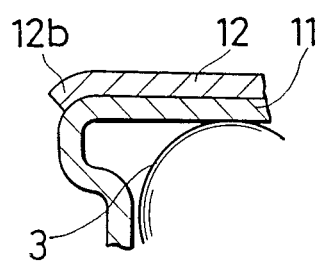
FIG.5(1)
FIG.5(2)
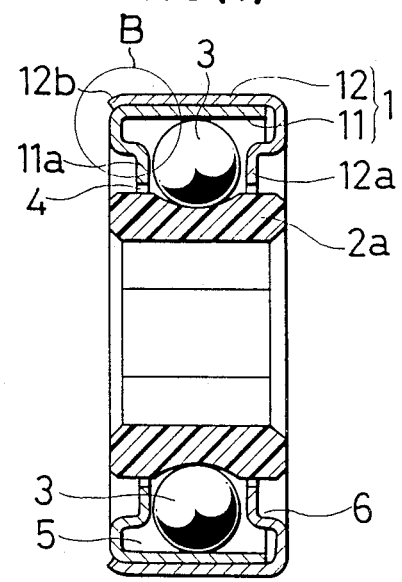
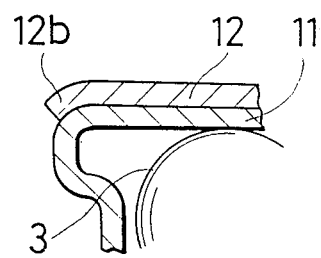

BALL BEARING

BACKGROUND OF THE INVENTION

The present invention relates to a ball bearing, and more particularly to a ball bearing in which balls may be loaded in an annular space formed between the inner ring and the outer ring without use of a cage.

Generally, a ball bearing is to be placed with balls held by the cage between the inner and outer rings. If no cage is used, the balls are adapted to rotate as coming in contact with one another. This may cause damages such as wear or seizure to the balls. However, the cage is not always required for ball bearings to be used for, for example, toy racing cars or casters, which are adapted to be used with a small load or to be rotated at a low speed and to which high precision is not required. For such ball bearings to which high precision is not required, if a high-quality material is used, or cutting or heat treatment is applied, the resultant ball bearings are unnecessarily high in quality to increase the cost thereof.

A ball bearing includes a number of component elements such as sealing elements, etc. For a very small bearing, it is particularly difficult to make such a bearing having a sealing structure.

In a ball bearing, the outer and inner rings are generally made of SUJ2, SUS440C (Japanese Industrial Standard) or the like. After being cut, the rings and other component elements are subjected to heat treatment, abrasion, assembling and the like. Accordingly, the production of a ball bearing takes a lot of manhours.

It is technically difficult to make a ball bearing in which balls are loaded in an annular space between the outer and inner rings without use of a cage.

There is known a method of making such a ball bearing as disclosed by, for example, Japanese Patent Publication No. 50-14236 which corresponds to U.S. Pat. No. 3,657,781. According to this method, balls are loaded between the outer race forming the outer ring and the inner race forming the inner ring, and either the inner or outer races is rotated under application of a pressure by a pair of rollers toward the balls from the outer side of the outer race and the inner side of the inner race, thereby to rolling-form both races.

There is known a ball bearing of which inner and outer rings are respectively made of a forging material and a steel sheet, as disclosed by U.S. Pat. No. 4,603,025 or British Pat. No. 1,007,191. In the ball bearing disclosed by U.S. Pat. No. 4,603,025, the outer ring is made in a U-shape by fitting, to the open side of a L-shape member, a separate lateral plate. Accordingly, the strength is not sufficient. Further, when both lateral plates of the outer ring are brought as close to the balls as possible to decrease the axial distances between both lateral plates and the balls, the width of the outer ring is decreased. This imposes restrictions on the supporting ability of the support member. On the contrary, when the width of the outer ring is increased, the axial distances between both lateral plates of the outer ring and the balls are increased to decrease the rotational performance of the bearing.

In British Pat. No. 1,007,191, the outer ring is made in a U-shape by combining two L-shape members. This presents no problem as to the strength, but the balls are guided by wires disposed at four places, causing the structure to be complicated. Further, since the balls are guided by wire rings, there is the likelihood that the balls are spun so that the ball bearing cannot be used for an application of high-speed rotation if radial and axial loads are exerted. Moreover, since only four rings receive the load exerted to the ball bearing, the ball bearing cannot carry a high load.

SUMMARY OF THE INVENTION

It is an object of the present invention to provide a ball bearing in which balls are loaded in an annular space between an outer ring and an inner ring without use of a cage, and which may be made with relatively simple machining to reduce the cost.

The ball bearing in accordance with the present invention comprises:

an outer ring including (i) an inner cylindrical body made of a steel sheet of which one peripheral edge is bent to form one flange, and (ii) an outer cylindrical body of which one peripheral edge is bent to form another flange, the outer cylindrical body being press-fitted to the inner cylindrical body;

an inner ring made of a forging material provided on the outer circumferential surface thereof with a raceway groove, the inner ring having a shaft hole of which section is circular or polygonal according to the section configuration of a shaft to be inserted into the shaft hole;

balls loaded in an annular space between the outer ring and the inner ring;

both flanges of the outer ring being drawn in the direction toward the balls in order to prevent looseness thereof, the parts of the flanges in the vicinity of the Pitch Circle Diameter of the balls being bent and drawn toward the balls in parallel with a rotational axis of the ball bearing with radially inward-directed parts of the flanges extending radially inwardly from the drawn portions and at right angles to the rotational axis of the ball bearing, with inner lateral surfaces of the radially inward-directed parts being flat corresponding to the Pitch Circle Diameter of the balls, thus serving as ball guiding members; and gaps formed between the outer circumferential surface of the inner ring and the ends of the flanges of the outer ring being small so that the ball bearing has a sealing structure.

A modified ball bearing in accordance with the present invention comprises:

an outer ring including (i) an inner cylindrical body made of a steel sheet of which one peripheral edge is bent to form one flange, and (ii) an outer cylindrical body of which one peripheral edge is bent to form another flange, the outer cylindrical body being press-fitted to the inner cylindrical body;

an inner ring made of synthetic resin provided on the outer circumferential surface thereof with a raceway groove, the inner ring having a shaft hole of which section is circular or polygonal according to the section configuration of a shaft to be inserted into the shaft hole;

balls loaded in an annular space between the outer ring and the inner ring;

both flanges of the outer ring drawn in the direction toward the balls in order to prevent looseness thereof, the parts of the flanges in the vicinity of the Pitch Circle Diameter of the balls being bent and drawn toward the balls in parallel with a rotational axis of the ball bearing with radially inward-directed parts of the flanges extending radially inwardly from the drawn portions and at right angles to the rotational axis of the ball bearing, with inner lateral surfaces of the radially inward-directed parts being flat corresponding to the Pitch Circle Diameter of the balls, thus serving as ball guiding members; and gaps formed between the outer circumferential surface of the inner ring and the ends of the flanges of the outer ring being small so that the ball bearing has a sealing structure.

According to the ball bearing of the present invention, the outer cylindrical body of the outer ring may be caulked and bent, at the peripheral edge thereof at the other side of the flange thereof, along the round corner of the inner cylindrical body.

According to the ball bearing, both flanges of the outer ring are drawn in the direction toward the balls to reduce the axial distances between the flanges and the balls. This assures the rotational performance of the bearing regardless of the width of the outer ring. In the outer ring, the inner cylindrical body is pressfitted to the outer cylindrical body and both flanges are drawn in the direction toward the balls. This increases the section area of the outer ring to increase the strength thereof. Accordingly, the ball bearing may carry a higher load.

There is now made comparison of the bearing of the present invention with the bearing in accordance with U.S. Pat. No. 4,603,025 or British Pat. No. 1,007,191 as to the distances between the ends of both flanges of the outer ring and the outer circumferential surface of the inner ring, provided that the width of the outer ring of the present invention is identical with that of the outer ring of the prior art above-mentioned. The distances in the present invention may be made smaller than those in the prior art. Accordingly, the bearing of the present invention is superior in sealing property to the prior art. More specifically, for example when the outer rings are inclined in the same amount, the ends of the flanges of the outer ring of the present invention are brought nearer to the center of the bearing such that the approaching distance of the ends of the flanges to the inner ring is smaller, while the ends of the flanges of the outer ring of the prior art are brought remoter from the center of the bearing so that the approaching distance of the flanges to the inner ring is greater. Accordingly, to prevent the ends of the flanges of the outer ring from coming in contact with the circumferential surface of the inner ring when the outer ring is inclined, it is required in the prior art that the distances between the ends of the flanges of the outer ring and the outer circumferential surface of the inner ring are made greater than in the present invention.

According to the ball bearing of the present invention, balls may be loaded without use of a cage and the balls thus loaded may be restrained from moving in the axial direction. Further, the ball bearing of the present invention may be manufactured with less manhours, resulting in decreased cost. Further, according to the present ball bearing, the shaft inserting hole of the inner ring may be formed, by forging, in the form of a circle or a polygon. Accordingly, when the shaft to be inserted into the shaft hole has a polygonal section, the shaft hole of the inner ring may be so formed as to be in accordance with the section configuration of the shaft. This prevents the inner ring from presenting creep.

According to the present invention, the inner ring may be made of synthetic resin instead of a forging material. This advantageously makes the resultant bearing light-weight.

According to the present invention, the outer cylindrical body of the outer ring may be caulked and bent, at the peripheral edge thereof at the other side of the flange thereof, along the round corner of the inner cylindrical body. The ball bearing having such an arrangement may carry a higher load.

BRIEF DESCRIPTION OF THE DRAWINGS

FIG. 1 is an axial section view of a ball bearing in accordance with a first embodiment of the present invention;

FIG. 2 is a section view taken along the line X—X in FIG. 1;

FIG. 3 is an axial section view of a ball bearing in accordance with a second embodiment of the present invention;

FIG. 4 (1) is an axial section view of a modification of the ball bearing in FIG. 1, while FIG. 4 (2) is an enlarged view of a portion A of FIG. 4 (1); and FIG. 5 (1) is an axial section view of a modification of the ball bearing in FIG. 3, while FIG. 5 (2) is an enlarged view of a portion B of FIG. 5 (1).

DESCRIPTION OF THE PREFERRED EMBODIMENTS

The following description will discuss preferred embodiments of the present invention with reference to the attached drawings.

As shown in FIGS. 1 and 2, an outer ring 1 is formed by press-fitting an outer cylindrical body 12 to an inner cylindrical body 11. An inner ring 2 is made by cutting a forging material.

As mentioned earlier, the outer and inner rings of a ball bearing have been conventionally made by cutting. According to the present invention, the outer ring 1 is formed, as a press-molded article, by forming a steel sheet into a cylindrical body and by bending one peripheral edge thereof.

When manufacturing the ball bearing of the present invention, the inner cylindrical body 11 made of a steel sheet is bent inwardly in the radial direction, at one peripheral edge thereof, by pressing, thereby to form a flange 11a. Likewise, the outer cylindrical body 12 made of a steel sheet is bent inwardly in the radial direction, at one peripheral edge thereof, by pressing, thereby to form a flange 12a.

The inner ring 2 is made of a forging material and is provided on the outer circumferential surface thereof with a raceway groove 21 by rolling, cutting or grinding. A shaft hole 22 of the inner ring 2 is machined according to the section configuration of a shaft to be inserted into the shaft hole 22. More specifically, when the shaft to be inserted into the shaft hole 22 has a circular section, the shaft hole 22 is so machined as to have a circular section. When the shaft has a polygon section, for example a hexagonal section, the shaft hole 22 is so machine as to have a hexagonal section, and so on.

Balls 3 are loaded, without use of a cage, in an annular space 5 formed between the inner cylindrical body 11 and the raceway groove 21 of the inner ring 2. Then, the outer cylindrical body 12 is press-fitted to the inner cylindrical body 11. In assembling, the balls 3 are first placed on the raceway surface 21 of the inner ring 2, and the inner cylindrical body 11 is then put on the balls 3, after which the outer cylindrical body 12 is press-fitted to the inner cylindrical body 11. The flange 11a of the inner cylindrical body 11 and the flange 12a of the outer cylindrical body 12 are bent to form portions 6 drawn in the direction toward the Pitch Circle Diameter of the balls 3, thereby to prevent looseness of the flanges 11a, 12a. In the following, the flanges 11a and 12a will be more specifically described. The part of the flange 11a in the vicinity of the Pitch Circle Diameter of the balls 3 is bent and drawn toward the balls 3 in parallel with a rotational axis of the ball bearing, thereby to form a drawn portion 6. The radially inward-directed part of the flange 11a which extends radially inwardly from the drawn portion 6 is at a right angle to the rotational axis of the ball bearing, thus serving as a ball guiding member. As also apparent from FIGS. 1 and 2, the inner lateral side of this ball guiding member is flat, corresponding to the Pitch Circle Diameter of the balls 3, and this flat inner lateral side guides the balls 3.

Likewise, the part of the flange 12a in the vicinity of the Pitch Circle Diameter of the balls 3 is bent and drawn toward the balls 3 in parallel with the rotational axis of the ball bearing to form a drawn portion 6. The radially inward-directed part of the flange 12a which further extends radially inwardly from the drawn portion 6 is at a right angle to the rotational axis of the ball bearing, thus serving as a ball guiding member. The inner lateral side of this ball guiding member is also flat, corresponding to the Pitch Circle Diameter of the balls 3, and this flat inner lateral side guides the balls 3. Gaps 4 formed between the outer peripheral edge of the inner ring 2 and the ends of the flanges 11a and 12a of the outer ring 1, are small so that the ball bearing has a sealing structure. The outer ring 1 has a raceway surface 11c in contact with the balls 3. This raceway surface 11c may be flat or slightly curved.

FIG. 3 shows the ball bearing in accordance with a second embodiment of the present invention. The ball bearing of the second embodiment differs from the ball bearing shown in FIG. 1 in that the inner ring 2a in FIG. 3 is made of synthetic resin.

The following description will discuss a modification of the ball bearing in accordance with the first embodiment of the present invention, with reference to FIG. 4 (1) and FIG. 4 (2).

In the ball bearing in FIG. 1, the outer ring 1 is formed by press-fitting the outer cylindrical body 12 to the inner cylindrical body 11. Thus, both cylindrical bodies are held with only the clamp forces thereof.

In the ball bearing in FIG. 4, the peripheral edge 12b of the outer cylindrical body 12 opposite to the flange 12a is caulked and bent along the round corner of the inner cylindrical body 11. Accordingly, the ball bearing in FIG. 4 may carry a higher load.

FIGS. 5 (1) and (2) are similar to FIGS. 4 (1) and (2), illustrating a modification of the ball bearing.

In the ball bearing in FIG. 1, the outer ring 1 is formed by press-fitting the outer cylindrical body 12 to the inner cylindrical body 11, and sustained with only the clamp forces of the cylindrical bodies.

In the ball bearing in FIG. 5, the peripheral edge 12b of the outer cylindrical body 12 opposite to the flange 12a is caulked and bent along the round corner of the inner cylindrical body 11. Accordingly, the ball bearing in FIG. 5 may carry a higher load.

According to the ball bearing of the present invention, both flanges of the outer ring are drawn in the direction toward the balls. This not only improves the strength of the outer ring, but also assures the rotational performance of the ball bearing regardless of the width of the outer ring. Further, according to the present invention, the distances between the ends of both flanges of the outer ring and the outer circumference of the inner ring are small to improve the sealing property of the ball bearing. Further, the inner ring 2 has the raceway surface 21 on which the balls 3 are placed and sealed without use of a cage. Accordingly, the balls 3 may be restrained from being axially moved. Further, when the shaft to be inserted into the shaft hole 22 of the inner ring 2 has a polygonal section, the shaft hole 22 may be so formed as to have a section in accordance with the section configuration of the shaft. This prevents the inner ring from presenting creep.

The flange 12b at the other peripheral edge of the outer cylindrical body 12 opposite to the flange 12a may be caulked after the outer cylindrical body 12 has been press-fitted to the inner cylindrical body 11. This is effective to enable the ball bearing to carry a higher load with the lifetime lengthened.

What is claimed is:

1. A ball bearing comprising:
   an outer ring including (i) an inner cylindrical body made of a steel sheet of which one peripheral edge is bent inwardly in a radial direction to form a round corner and a first flange with a radial inwardly directed part, and (ii) an outer cylindrical body of which one peripheral edge is bent inwardly in a radial direction to form a second flange with a radial inwardly directed part, said outer cylindrical body having a portion press-fitted to said inner cylindrical body;
   an inner ring made of a forging material provided on its outer circumferential surface thereof with a raceway groove, said inner ring having a shaft hole of which section is circular or polygonal according to a section configuration of a shaft to be inserted into said shaft hole,
   balls loaded in an annular space between said outer ring and said inner ring;
   said first and second flanges of said outer ring being drawn in a rotational axis direction toward said balls in order to prevent looseness of said balls, said first and second flanges including parts in a vicinity of a Pitch Circle Diameter of said balls which are bent and drawn toward said balls parallel with a rotational axis of the ball bearing with radially inward-directed parts of said flanges extending radially inwardly from the drawn portions and at right angles to said rotational axis of the ball bearing, with inner lateral surfaces of said radially inward-directed parts being flat corresponding to the Pitch Circle Diameter of said balls thus serving as ball guiding members; and
   gaps formed between said outer circumferential surface of said inner ring and the ends of said first and second flanges of said outer ring being small so that said ball bearing has a sealing structure.

2. A ball bearing as set forth in claim 1, wherein the outer cylindrical body of the outer ring is caulked and bent at a peripheral edge thereof at a side opposite from said second flange along the round corner of the inner cylindrical body.

3. A ball bearing as set forth in claim 2, in which said inner ring is made of a synthetic resin.

4. A ball bearing as set forth in claim 1, in which said inner ring is made of a synthetic resin.

* * * * *